United States Patent [19]
Dilley et al.

[11] Patent Number: 6,052,280
[45] Date of Patent: Apr. 18, 2000

[54] CARBON/CARBON HEAT SPREADER

[75] Inventors: Roland L. Dilley, Lomita; Carl E. Kiser, Redondo Beach, both of Calif.

[73] Assignee: AlliedSignal Inc., Morristown, N.J.

[21] Appl. No.: 09/233,387

[22] Filed: Jan. 19, 1999

[51] Int. Cl.[7] .............................. G06F 1/20; H05K 7/20; F28D 15/02
[52] U.S. Cl. .......................... 361/687; 361/700; 361/704; 165/104.33; 174/15.2
[58] Field of Search ..................................... 361/687–689, 361/700, 704; 364/708.1; 165/86, 104.33; 174/15.2; 427/450, 122, 206

[56] References Cited

U.S. PATENT DOCUMENTS

| | | | |
|---|---|---|---|
| 3,829,556 | 8/1974 | Logan et al. | 423/409 |
| 4,603,731 | 8/1986 | Olsen | 165/41 |
| 4,867,235 | 9/1989 | Grapes et al. | 165/185 |
| 4,968,491 | 11/1990 | Nishizawa | 422/247 |
| 4,987,289 | 1/1991 | Bishop et al. | 219/209 |
| 5,077,637 | 12/1991 | Martorana et al. | 361/386 |
| 5,383,340 | 1/1995 | Larson et al. | 62/259.2 |
| 5,390,734 | 2/1995 | Voorhes et al. | 165/185 |
| 5,559,614 | 9/1996 | Urbish et al. | 359/44 |
| 5,566,752 | 10/1996 | Arnold et al. | 165/185 |
| 5,606,341 | 2/1997 | Aguilera | 345/87 |
| 5,766,691 | 6/1998 | Arnold et al. | 427/450 |
| 5,818,693 | 10/1998 | Garner et al. | 361/700 |
| 5,822,187 | 10/1998 | Garner et al. | 361/687 |
| 5,825,624 | 10/1998 | Arnold et al. | 361/708 |
| 5,847,925 | 12/1998 | Progl et al. | 361/687 |

*Primary Examiner*—Leo P. Picard
*Assistant Examiner*—Anatoly Vortman
*Attorney, Agent, or Firm*—Felix L. Fischer; Constantine Marantidis

[57] ABSTRACT

A system and method is provided for heating the LCD display of an electronic device and especially a small electronic device as for example a laptop computer. The system consists of a heat spreader plate attached to a back surface of the LCD. A heat absorption plate is used to absorb heat generated by the electronic components of the electronic device. A heat transfer conduit is used to transfer the heat from the heat absorption plate to the heat spreader plate where the heat is dissipated to the LCD display. The method requires the absorption of heat generated by the electronic device and the transfer of such heat to the LCD display.

10 Claims, 8 Drawing Sheets

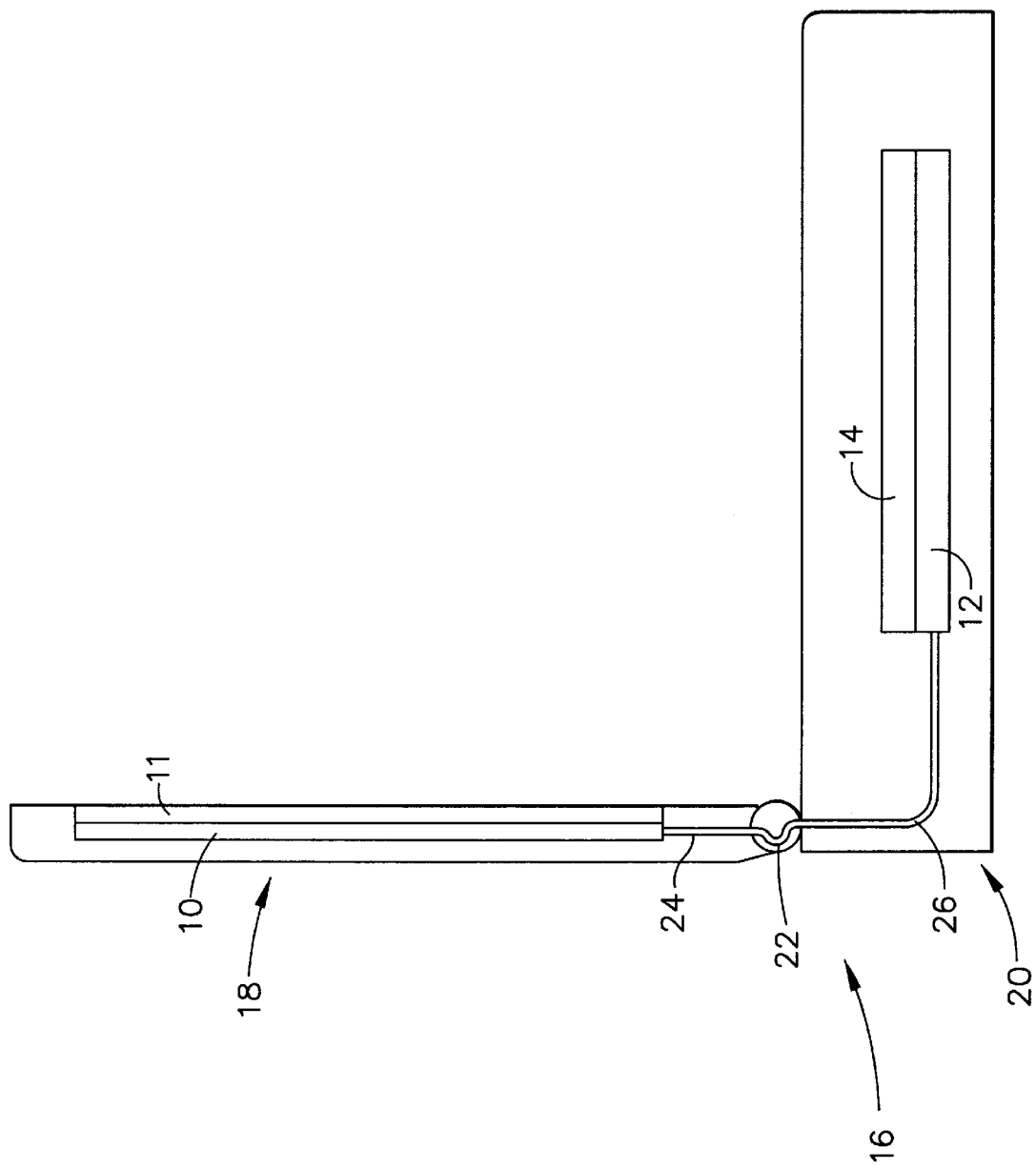

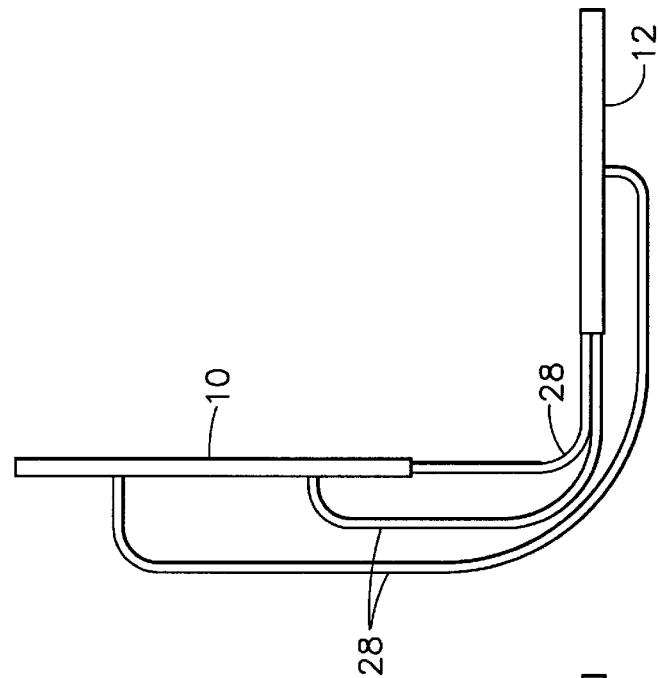
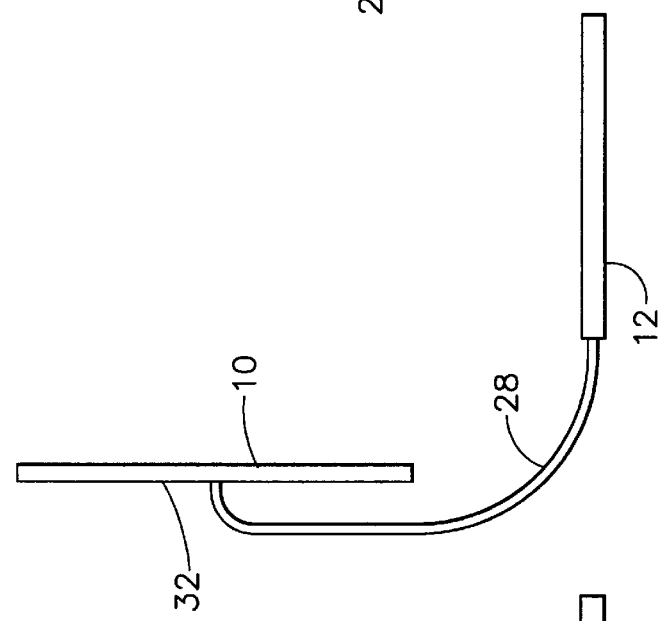
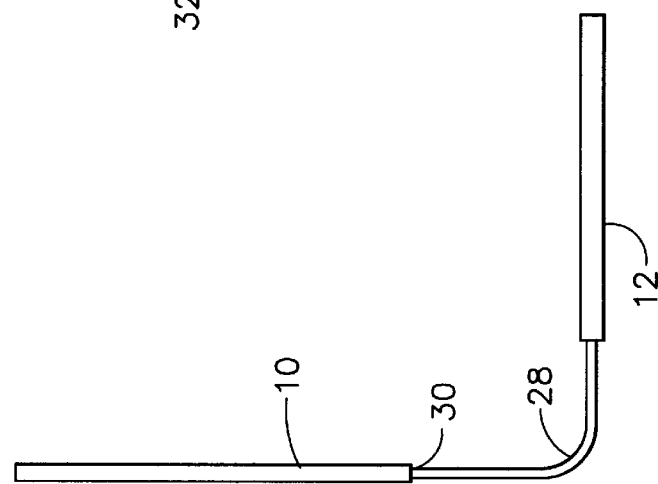

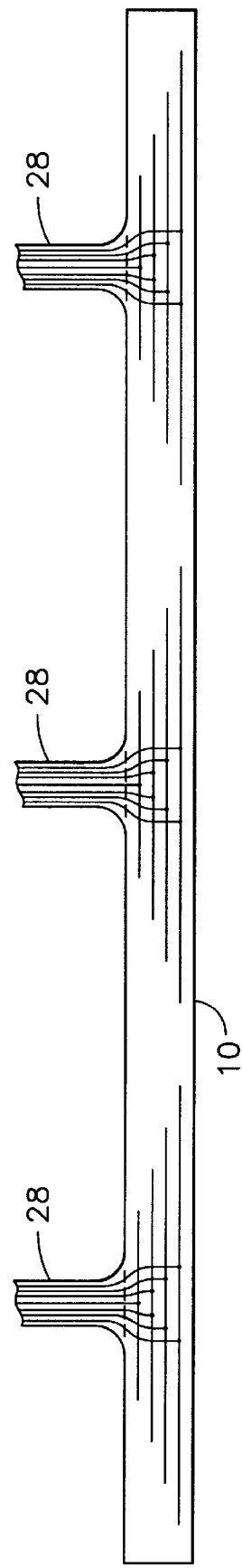

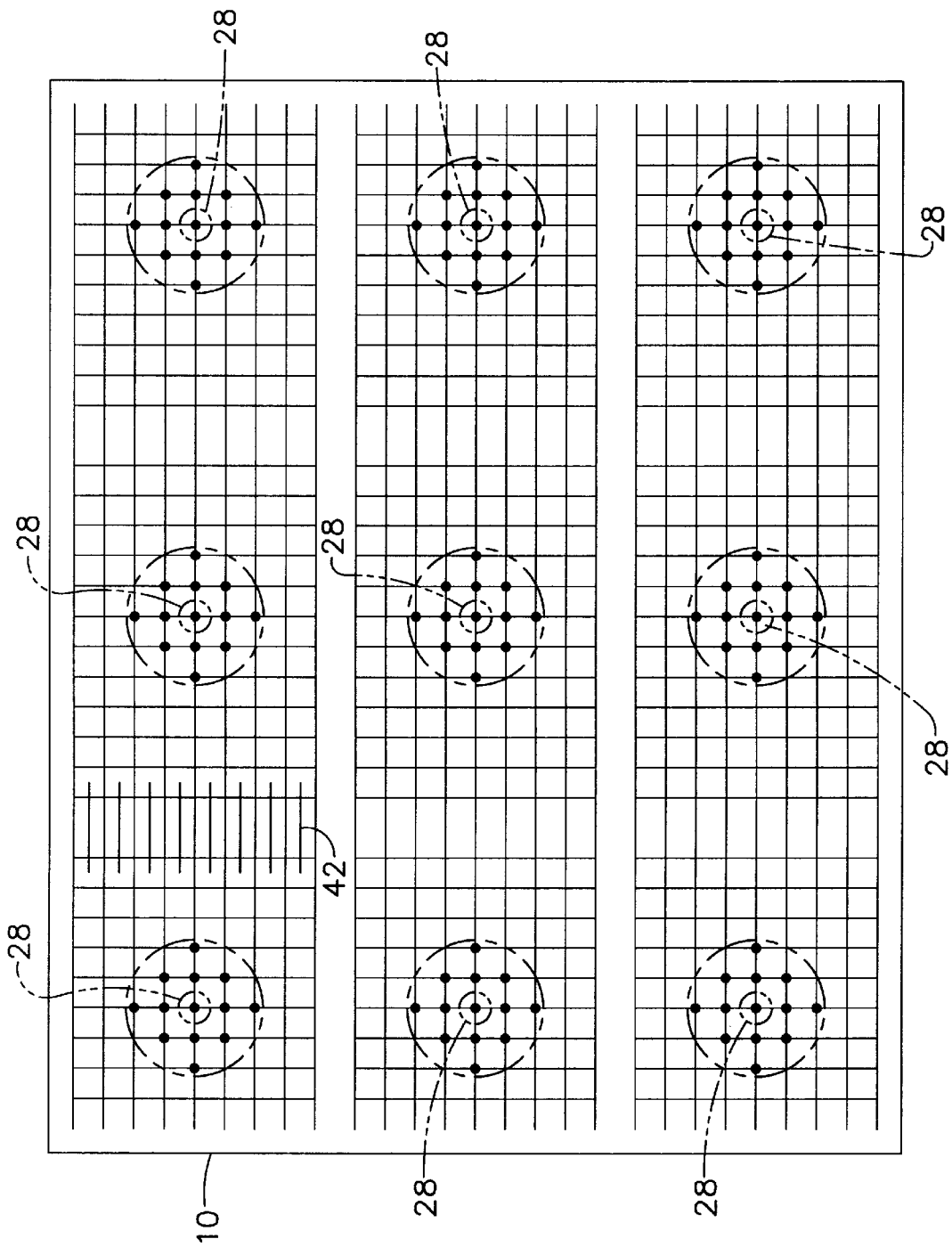

CARBON/CARBON HEAT SPREADER

BACKGROUND OF THE INVENTION

The present invention is directed to a heating system and method for heating an electronic device and preferably a small electronic device such as an LCD of a laptop computer.

To operate efficiently, LCDs must be constantly heated. However, to prolong the life of electronic circuitry, heat generated by such circuitry must be dissipated.

Typically, LCDs are heated by applying heat to the rear surface of the LCD. Heating LCDs in small electronic devices such as laptop computers is difficult because of the small spaces available for heating. Currently, LCD heating may occur through use of electrical heating devices. On the other hand, electric fans are used to cool the circuitry. The heating devices and fans draw power from the power driving the laptop computer.

As such, there is a need for a system for efficiently heating the LCD display and cooling the electronic circuitry of an electronic device without drawing from the power available for powering the electronic device or laptop computer housing the LCD.

SUMMARY OF THE INVENTION

The present invention is directed to a heat spreader plate, preferably one made from carbon/carbon. The system consists of a heat spreader plate attached to a back surface of an LCD display. A heat absorption plate is preferably connected to electronic circuitry, such as an electronic circuit board or an electronic chip in an electronic device, for absorbing the heat generated by that device. A heat transfer conduit, preferably a carbon/carbon heat transfer conduit consisting of carbon fibers bundled together and carbonized, is used to transfer heat from the absorption plate to the spreader plate. The LCD display is typically mounted on the cover of an electronic device such as a laptop computer whereas the electronic circuitry is housed in the main body of the laptop computer. As such, the heat must travel from the body through the hinges attaching the cover to the body and then to the cover. When used in a laptop computer, a flexible link is provided in the heat transfer conduit and positioned in the hinge. Alternatively, the heat transfer conduit consists of a plurality of flexible carbon fibers which are not carbonized.

The heat absorbed by the absorption plate is transferred to the heat spreader plate via the heat transfer conduit where it is distributed onto the LCD rear surface. To allow for a more even distribution of heat to the LCD use of multiple heat transfer conduits distributed over the plate is preferred.

DESCRIPTION OF THE DRAWINGS

FIG. 1 is a cross sectional view of an LCD heating system according to the present invention in a laptop computer.

FIGS. 2A, 2B and 2C are different embodiments of the LCD heating system of the present invention showing various heat transfer conduit schemes.

FIG. 4A is a cross sectional view of a spreader plate having multiple groupings of fibers that are interfacing with multiple heat transfer conduits.

FIG. 4B is a top view of a heat spreader plate showing multiple groupings of carbon fibers that are interfacing with multiple heat transfer conduits.

DETAILED DESCRIPTION OF THE INVENTION

Figure 3A:
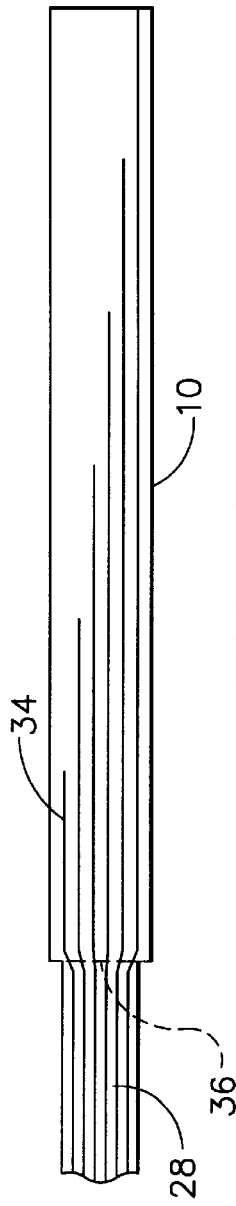
FIGS. 3A, 3B and 3C are cross sectional views of spreader plates of the present invention depicting alternative fiber and conduit arrangements.

To operate at their optimum efficiency, LCD displays must be heated. The present invention provides a system and a method for heating LCDs. At the heart of the system is a spreader plate 10. The heat spreader is used to spread to the LCD 11, the heat absorbed by a heat absorption or heat sink plate 12 that is attached to the back of a circuit board 14, chip or other heat generating component found in an electronic device 16 incorporating the LCD (FIG. 1).

While the present invention may be used with many electronic devices, for illustrative purposes it is described here in relation to a laptop computer. The spreader plate is preferably made from a carbon/carbon material. The heat absorption plate is also preferably made from carbon/carbon. Carbon/carbon plates typically consist of carbon fibers embedded in a carbon matrix. Both the spreader plate and the heat absorption plate are made using conventional processes for fabricating carbon/carbon composites.

Carbon/carbon composites such as plates are produced by numerous methods. In one method, the plates are formed by laying up layers of carbon/phenolic prepregs. These layers are typically in tape or sheet form. The prepregs typically consist of carbon fibers impregnated with a phenolic resin. The prepregs may be unidirectional or in a woven form. Unidirectional prepregs are formed by impregnating fibers aligned in a single direction with a resin to form the tape or sheet. Woven prepregs consist of fibers woven to form a fabric that is then impregnated with a resin. The typical woven fabrics consists of a first set of fibers woven perpendicularly with a second set of fibers forming a fabric consisting of fibers running in the warp and in the welt directions.

To form the carbon/carbon composite plate, the prepreg layers are laid one on top of the other. If unidirectional prepreg tape is used, the prepregs are laid such that the fibers from all the laid layers are aligned in a single direction. Alternatively, the layers are aligned in various directions. It is common for prepreg tape layers to be laid at 90° or 45° to each other. The same can occur with the woven tape of course, the woven tape already consists of fibers that are 90° to each other.

Once the prepreg layers are laid up to form a plate, the plate is autoclave cured, carbonized and then repeatedly re-impregnated with pitch or phenolic resin. Carbonization can occur multiple times before a desired high carbon/carbon density is achieved.

Alternatively, carbon/carbon plates are formed by producing preforms of carbon fiber pultrusions that are then densified with carbon by either chemical vapor deposition or chemical vapor infiltration. This densification process is typically performed until the matrix is so dense that no more carbon can be deposited in the fibers.

The heat absorption plate is connected to the spreader plate using a heat transfer conduit. This heat transfer conduit can be a cable or may be a carbon/carbon bundle. A bundle is typically formed by bundling together carbon fibers and then carbonizing them. The bundle alternatively consists of bundled carbon fibers which are not carbonized. A plurality of carbon fibers which are not bundled may also be used as heat transfer conduits.

In laptop computers, the LCD is mounted on the cover 18 whereas the computer circuit board is located in the laptop main case 20. As such, when used with laptop computers, the heat spreader plate will be located in the laptop cover whereas the absorption plate will be located in the laptop main body. As such, the heat spreader plate must be able to move with the cover. In these embodiments, therefore, the heat transfer conduit should consist of a flexible portion 22 which may be a cable or a grouping of carbon fibers. For example, if the spreader plate and heat absorption plates have integral conduits 24, 26, these integral conduits should interface with a flexible cable or a group of fibers. Alternatively, a bundle of fibers are used to form the entire heat transfer conduit.

A heat transfer conduit 28 is connected to an edge 30 of the heat spreader plate 10, or may be connected to any other surface, as for example the back surface 32 on the heat spreader plate (FIGS. 2A and 2B). Multiple heat transfer conduits are used to transfer heat between the absorption plate and the spreader plate in alternate embodiments (FIG. 2C).

To increase the efficiency of the LCD display, heat should be uniformly spread across the entire back surface of the LCD display.

Figure 3B:
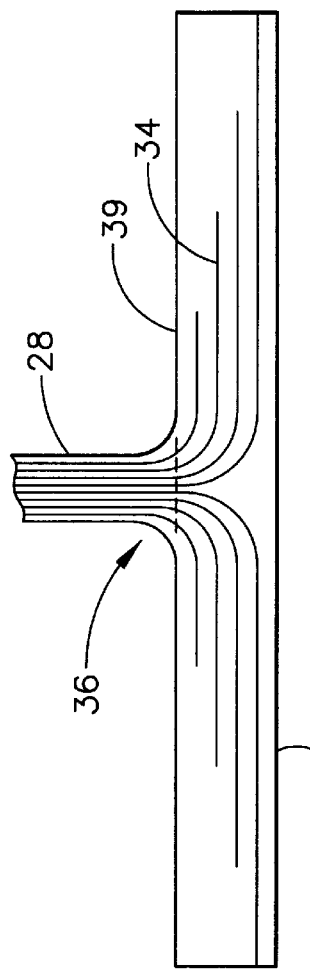

In a first embodiment, the spreader plated is formed from a carbon/carbon material using fibers 34 of various lengths. These fibers can be oriented in a single or multiple directions. In one embodiment, all the fibers extend to a single location 36. Preferably this is the location where the heat transfer conduit 28 interfaces with the spreader plate (FIGS. 3A, 3B and 3C).

Figure 3C:
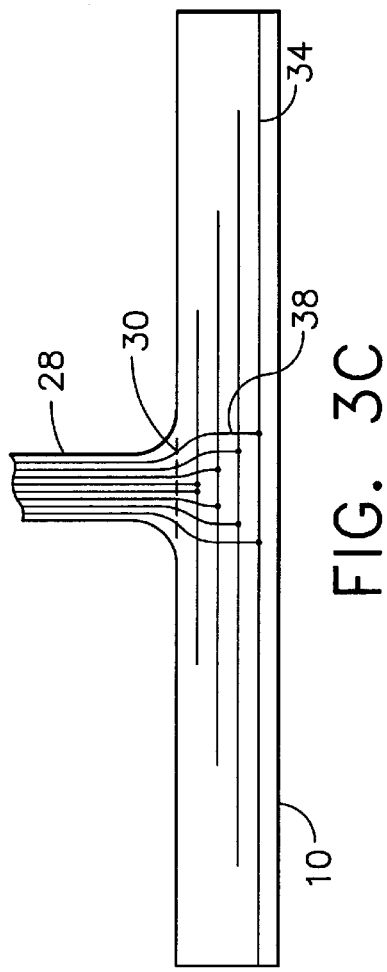

In the embodiment where a conduit is connected to a back surface of the spreader plate, it is preferred that transverse carbon fibers 38 run from the back surface through the thickness of the spreader plate and interface with other fibers running along the plane of the spreader plate (FIG. 3C). These transverse fibers provide a path for transferring the heat from the heat transfer conduit 28 to the various layers of fibers of the spreader plate. Typically these transverse carbon fibers are confined within a location 36 on the back surface of the spreader plate that forms the interface surface with the heat transfer conduit. These transverse carbon fibers are alternatively the fibers making up the heat transfer conduit. In other embodiments, the spreader plate is formed with some carbon fibers extending perpendicularly to the plate rear surface 39 as shown in FIG. 3B. The location on the rear surface of the plate to which these fibers extend preferably forms an interface for connecting with a heat transfer conduit. Alternatively, these fibers are used to form a heat transfer conduit.

The spreader plate will typically be the hottest in an area at and surrounding the interface with a heat transfer conduit. Moreover, the heat dissipated by a carbon fiber decreases along the length of the fiber in a direction away from the heat transfer conduit that delivered heat to the fiber. To get a better heat distribution throughout the spreader plate and thus, to the LCD, it is preferred that multiple heat transfer conduits be used. In this regard, the heat will be distributed over the spreader plate by being delivered to different location on the plate by the multiple heat transfer conduits (FIGS. 4A, 4B, 4C and 5).

In embodiments where multiple heat transfer conduits are used, grouping of fibers are used with each group consisting of fibers of different lengths. In each group all the fibers may extend to a location which interfaces with a heat transfer conduit.

Figure 4C:
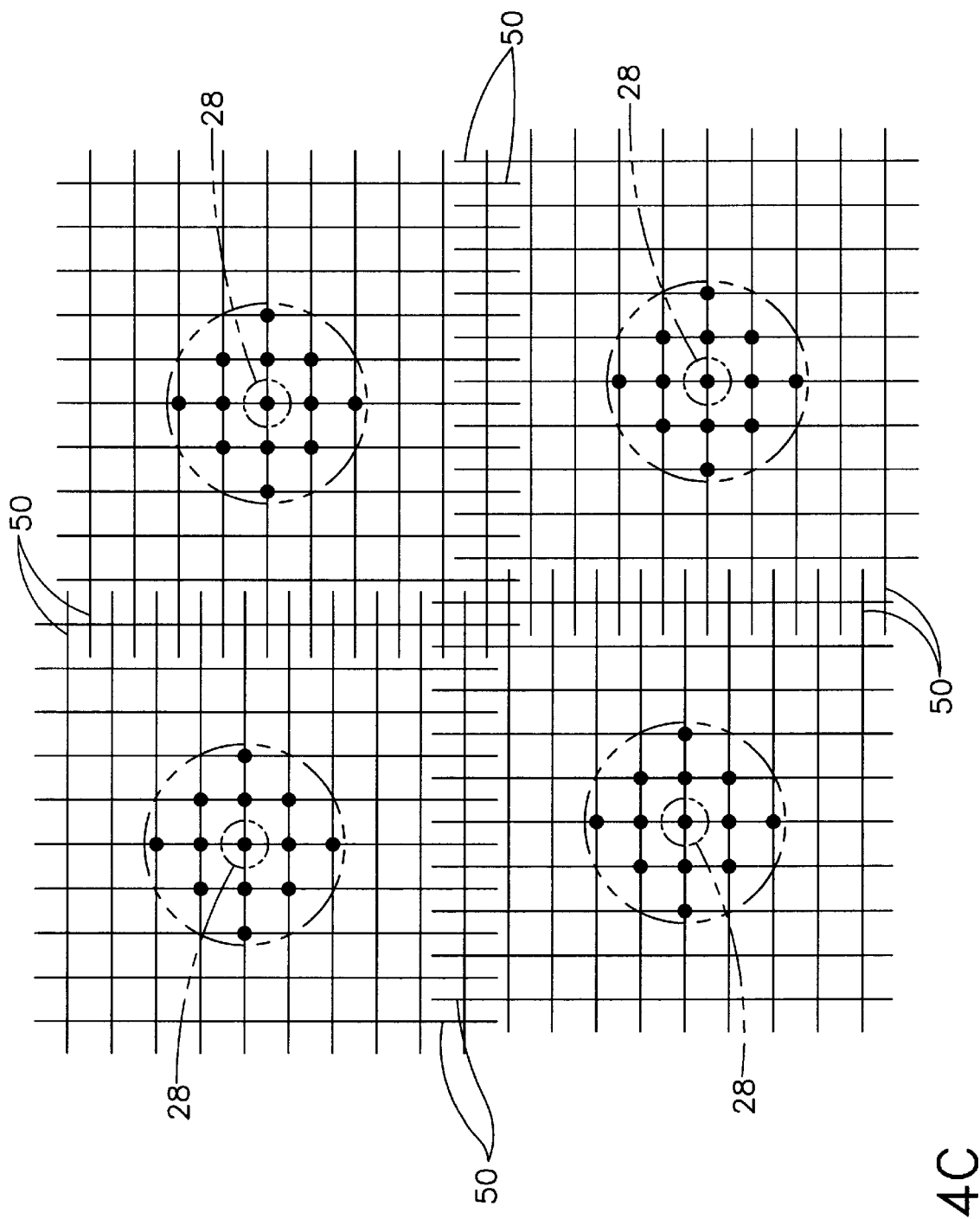
FIG. 4C is a partial top view of a heat spreader plate incorporating different groupings of carbon fibers overlapping with each other and interfacing with multiple heat transfer conduits.
Figure 5:
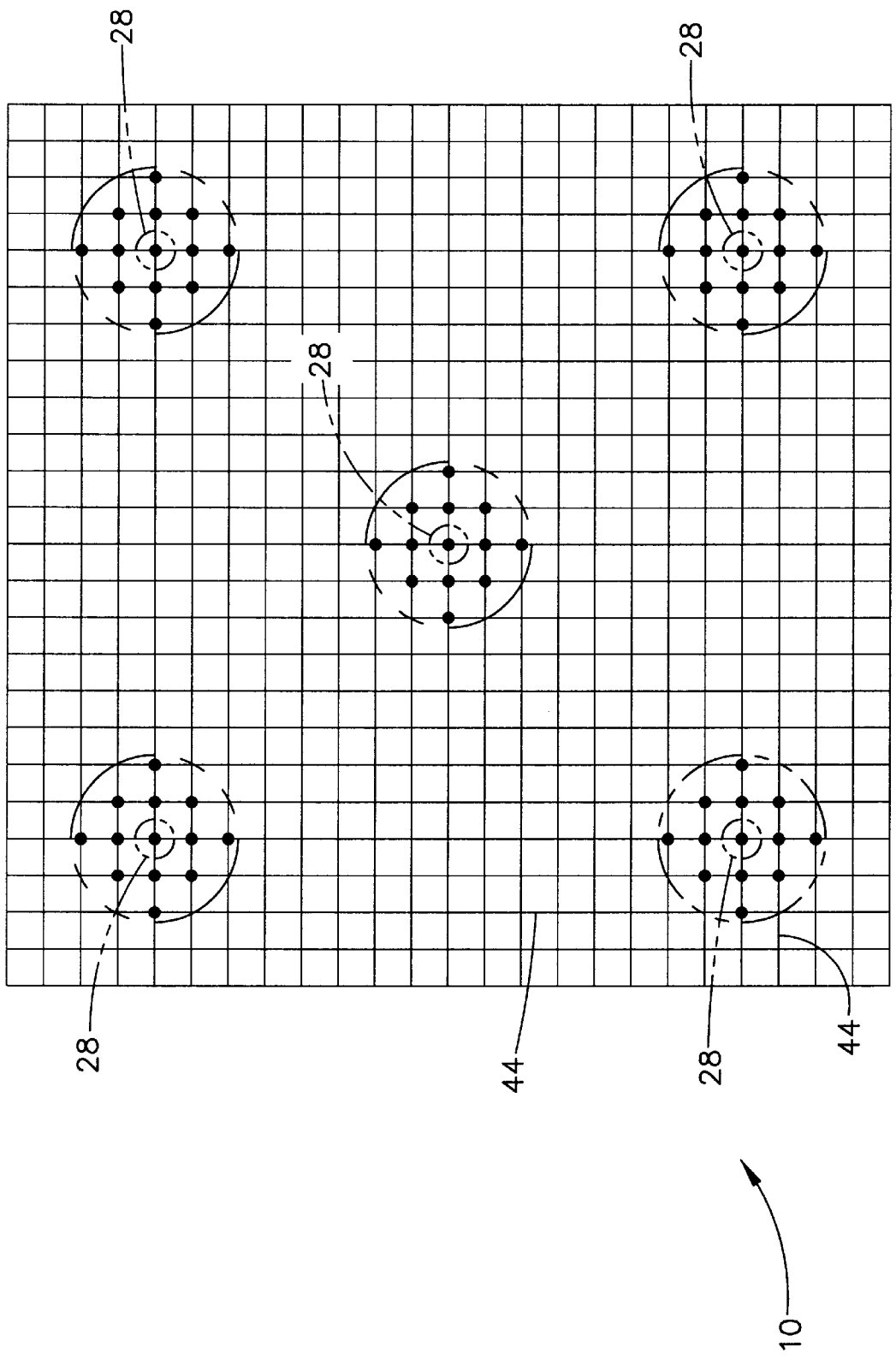
FIG. 5 is a top view of a heat spreader plate incorporating fibers running the entire length and width of the heat spreader plate and interfacing with multiple heat transfer conduit
Figure 6:
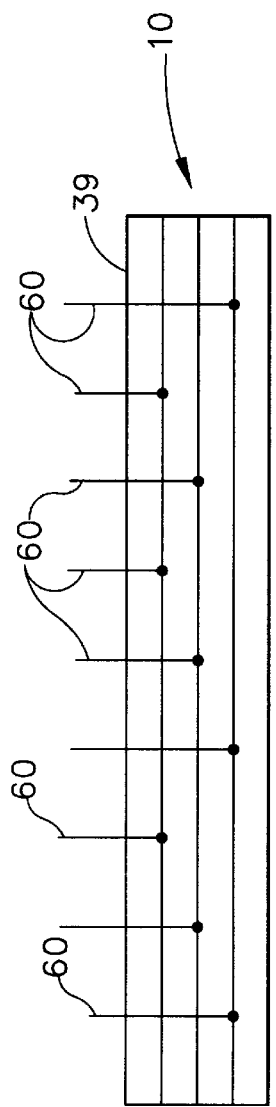
FIG. 6 is a cross-sectional view of a heat spreader plate incorporating multiple carbon fibers distributed over the spreader plate rear surface as heat transfer conduits.

In one embodiment, as shown in FIG. 4A and most of FIG. 4B, fibers from one grouping do not overlap with fibers of another grouping. In another embodiment, fibers 50 from different groups overlap with each other as shown in FIG. 4C. In yet another embodiment, fibers 42 are used to bridge the different groups as shown in a portion of FIG. 4B. The overlapping and/or bridging of fibers from different groups allows for a better heat distribution over the spreader plate surface. While the spreader plates shown in FIGS. 4B and 4C consist of bidirectional fibers, the plates are alternatively formed solely with unidirectional fibers or even multi-directional fibers extending in more than two directions. In yet a further embodiment, shown in FIG. 5, multiple heat transfer conduits 28 are used to interface with a spreader plate consisting of continuous fibers 44 from edge to edge. In yet a further embodiment, shown in FIG. 6, individual carbon fibers 60 are used as heat transfer conduits. These fibers are spread throughout the rear surface 39 of the heat spreader plate and preferably interface with the different fibers forming the heat spreader plate. These fibers are bundled together prior to being coupled to the heat absorption plate.

Figure 7:
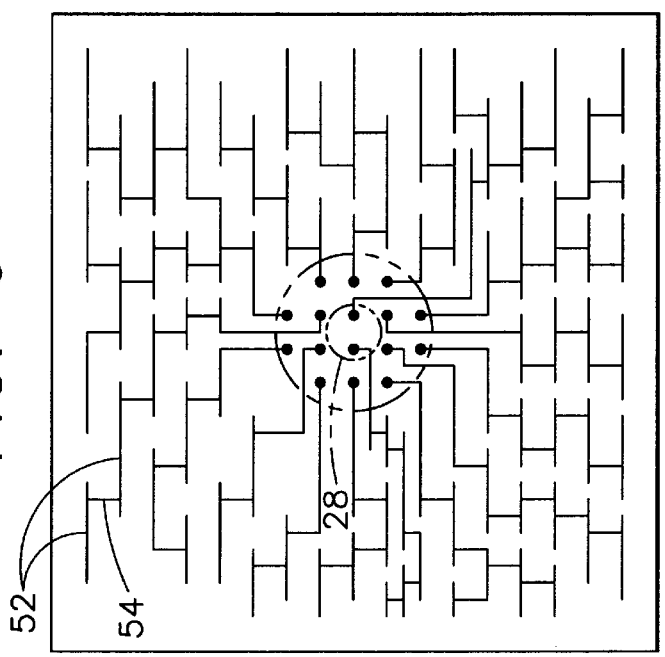
FIG. 7 is a top view of heat spreader plate formed with staggered carbon fibers of different lengths and incorporating fibers interconnecting the staggered fibers.

In other embodiments, the spreader plate may consist of carbon fibers 52 staggered throughout the plate (FIG. 7). Moreover, these fibers may be of different lengths. Fibers 54 also are used to interconnect the staggered fibers. By using fibers of different length, the fibers extend to different locations on the plate. Thus, the heat transferred the spreader plate by the heat transfer conduit or heat transfer conduits is transferred by the different fibers to different locations along the spreader plate, better distributing the heat.

As can be seen by one skilled in the art, the carbon/carbon spreader plate of the present invention can be tailored to provide a desired heat dissipation across its surface that interfaces with an LCD display.

In an alternative embodiment, multiple spreader plates are connected side by side to the back of the LCD. One or more heat transfer conduits then extend from each of the heat spreader plates and are coupled to the heat absorption plate. In this embodiment, if bundled heat transfer conduits are used it is preferred that each of the heat transfer conduits is connected around the center of the surface opposite the surface of the spreader plate attached to the LCD. In this regard, there will be an increased level of heat proximate the connection, but at the same time there will be an increased level of heat at the borders between bordering plates which will be caused by the accumulation of heat from each of the bordering plates. Consequently, a more uniform distribution of heat is achieved across the spreader plate surface.

Moreover, as is apparent to one skilled in the art the present invention can also be practiced by using a heat source instead of a heat absorption plate. For example, a heat source may be used to provide heat to the heat spreader plate via, preferably, a heat transfer conduit.

Such modifications and substitutions are within the scope and intent of the present invention as defined in the following claims.

What is claimed is:

1. An LCD heating system for an electronic device comprising:

a heat absorption plate for absorbing heat generated in an electronic device;

a carbon/carbon material heat spreader plate having carbon fibers running perpendicularly through the thickness of the plate and having a surface coupled to a rear surface of the LCD for heating the LCD, the through the thickness fibers having ends at the surface of the plate for interfacing with a conduit; and a heat transfer conduit coupled to the heat absorption plate and to the spreader plate for transferring heat from the heat absorption plate to the spreader plate for heating the LCD.

2. A system as recited in claim 1 wherein the spreader plate dissipates heat throughout its surface coupled to the LCD.

3. A system as recited in claim 1 wherein the heat absorption plate is mounted behind a circuit board for absorbing heat generated by the circuit board.

4. A system as recited in claim 1 wherein the heat absorption plate is mounted behind an electronic chip for absorbing heat generated by the chip.

5. A system as recited in claim 1 wherein the spreader plate consists of unidirectional carbon fibers.

6. A system as recited in claim 5 wherein the ends of the fibers are bundled to form at least part of the heat transfer conduit.

7. A system as recited in claim 1 wherein the spreader plate consists of staggered carbon fibers.

8. A system as recited in claim 1 wherein the spreader plate comprises two groups of carbon fibers.

9. A system as recited in claim 8 wherein fibers from one group overlap with fibers from the other group.

10. A system as recited in claim 8 further comprising fibers bridging the two groups.

* * * * *